United States Patent [19]
Latham

[11] Patent Number: 5,954,164
[45] Date of Patent: Sep. 21, 1999

[54] BRAKE SYSTEM FOR TOWED VEHICLES

[76] Inventor: Buddy L. Latham, 2384 Ridge Rd., Lexington, N.C. 27295

[21] Appl. No.: 08/996,573

[22] Filed: Dec. 23, 1997

[51] Int. Cl.[6] ........................................................ B60T 7/20
[52] U.S. Cl. ..................... 188/112 R; 188/345; 188/135; 303/7; 303/24.1
[58] Field of Search ................................ 188/112 R, 345, 188/135; 303/7, 24.1

[56] References Cited

U.S. PATENT DOCUMENTS

| | | | |
|---|---|---|---|
| 2,870,876 | 1/1959 | Pease | 303/24.1 |
| 3,909,075 | 9/1975 | Pittet, Jr. et al. | 303/24 C |
| 3,953,084 | 4/1976 | Pittet, Jr. et al. | 303/24 R |
| 4,726,627 | 2/1988 | Frait et al. | 303/24 R |
| 5,031,729 | 7/1991 | Wittkop et al. | 188/3 H |
| 5,199,535 | 4/1993 | Kaye | 188/135 |
| 5,213,396 | 5/1993 | Avery et al. | 303/7 |
| 5,411,321 | 5/1995 | Harness | 303/7 |
| 5,415,424 | 5/1995 | Dolan | 280/432 |
| 5,431,253 | 7/1995 | Hargrove | 188/3 H |
| 5,465,813 | 11/1995 | Lichter | 188/3 H |
| 5,503,468 | 4/1996 | Saffran | 303/7 |
| 5,551,539 | 9/1996 | Frymiare | 188/112 R |

OTHER PUBLICATIONS

The Foot Safety Manufacturing brochure, The Foot Safety Manufacturing, date unknown, brochure mailed Aug. 11, 1997.

VIP—TOW BRAKE brochure, VIP Systems International, Ltd., May 29, 1997.

Remco Braking System brochure, Remco, date unknown, believed to be prior art.

Tow–V–Aire Assist System brochure, Tow–V–Aire Braking, Inc., date unknown, brochure mailed Apr. 21, 1997.

Safe Tow Braking System, Northern Hydraulics' RV Direct catalog, copyright 1997, RV Flyer 526, p. 50, believed to be prior art.

Brakebuddy brochure, Master Concepts, Inc., Jul. 1997.

*Primary Examiner*—Robert J. Oberleitner
*Assistant Examiner*—Mariano Sy
*Attorney, Agent, or Firm*—Rhodes & Mason, P.L.L.C.

[57] ABSTRACT

The present invention relates to a braking system for a towed vehicle. The system comprises a weighted pendulum pivotally attached to the towed vehicle and having a swing path in the direction of travel of the towed vehicle; and a structure for translating the pivoting travel of the weighted pendulum to straight line travel of the brake pedal responsive to relative motion between the weighted pendulum and the towed vehicle. The structure for translating is a v-shaped pedal operating member secured to the towed vehicle brake pedal.

30 Claims, 7 Drawing Sheets

BRAKE SYSTEM FOR TOWED VEHICLES

1. Field of the Invention

The present invention relates to braking systems for towed vehicles. More particularly, the invention relates to a device for applying the brakes of a towed vehicle responsive to that vehicle's deceleration.

2. Background of the Invention

As motor homes have increased in popularity and gained in size, there has been a growing use of towing hitches to pull small vehicles behind the motor homes. These vehicles are more maneuverable than the large motor homes and thus facilitate local sightseeing in areas being visited. A problem facing these motor home owners as well as others who engage in towing a motor vehicle is the need to apply the brakes of the towed vehicle to enable the pair of vehicles to slow safely and in a controlled manner. The braking system of the towing vehicle typically is designed to stop that vehicle only. The extra weight and momentum generated by the towed vehicle can overwhelm the brake system of the towing vehicle, making the pair difficult to control and creating a possible safety problem. Thus, a number of systems have been developed to apply the brakes of a towed vehicle simultaneously or near simultaneously with the application of the brakes of the towing vehicle.

Systems developed thus far for applying the brakes of the towed vehicle employ a variety of techniques to interface with the towed vehicle's hydraulic or electric brake systems. For example, some of these systems create a hydraulic connection between the braking systems of the two vehicles such that the hydraulic pressure generated in the towing vehicle is channeled to the towed vehicle's braking system. For towed vehicles having electric brakes, systems have been designed to detect the deceleration of the towing vehicle and thus generate an electric signal to actuate the electric brakes of the towed vehicle. Each of these approaches requires complicated and costly connecting hoses, fittings and, in some cases, actuating assemblies. Moreover, systems that interconnect the hydraulic systems of the towing and towed vehicles together still place a burden on the towing vehicle's hydraulic system to operate not one but two brake systems to bring the pair of vehicles to a safe stop. It is believed that the long term usage of such a system is detrimental to the performance of the brakes in the towing vehicle.

There is a need then for a simple braking system for a towed vehicle that operates independently of the towing vehicle's brake system.

SUMMARY OF THE INVENTION

The present invention relates to a towed vehicle braking system that is simple in operation. The system does not require costly hydraulic system modifications or any kind of braking system inter-connection between the towing and towed vehicles. The components of the system are installed only in the towed vehicle and require only basic mechanical skills to set up for operation. The system comprises a weighted pendulum attached to the towed vehicle and having a swing path aligned with the direction of travel of the towed vehicle; and a brake pedal member secured to the towed vehicle brake pedal for braking engagement with the weighted pendulum responsive to relative motion between the weighted pendulum and the towed vehicle. The weighted pendulum may be comprised of a pendulum arm and a weight attached to the end of the arm. The weight may be configured as a plurality of detachable weight segments so that the amount of force applied to the towed vehicle brake pedal may be varied by adding or removing weight segments as needed.

The system may further comprise a swing controller connected between the weighted pendulum and the towed vehicle for preventing unwanted operation of the system during downhill travel. In a preferred embodiment the swing controller is a spring but may also take the form of a strip of elastic material having properties similar to that of a spring. The spring should have a spring constant sufficient to stop forward motion of the weighted pendulum caused by gravity.

In a preferred embodiment, the pedal attachment may be a v-shaped rigid member having a first section, in this case horizontal, attached to the brake pedal and a second, angled section extending therefrom. The angled section presents a pedal engaging surface for braking engagement with the weighted pendulum so as to slow the towed vehicle. The angle between the horizontal member and the angled member may range between about 50° and about 70°. Preferably, the angle between the horizontal section and the angled section is about 60°.

The braking system of the present invention may further comprise a pedal engaging surface located on the front side of the weighted pendulum. In a preferred embodiment, the pedal engaging surface comprises a projecting engagement member and roller for making physical contact with brake pedal.

The system may further include an auxiliary vacuum source tied into the towed vehicle brake system. This vacuum source would be activated by the towed vehicle brake light switch or by a separately provided switch. In a preferred embodiment, the vacuum source is a vacuum pump operated by the towed vehicle battery or by a separate battery. This aspect of the invention addresses the fact that much more pedal force may be required to apply a vehicle's power brakes when the vehicle's engine is not running.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

BRIEF DESCRIPTION OF THE DRAWINGS

FIG. 1A is a partial cutaway of the braking system of FIG. 1 showing an alternative embodiment of the swing controller of the present invention.

DETAILED DESCRIPTION OF THE PREFERRED EMBODIMENT

Figure 1:
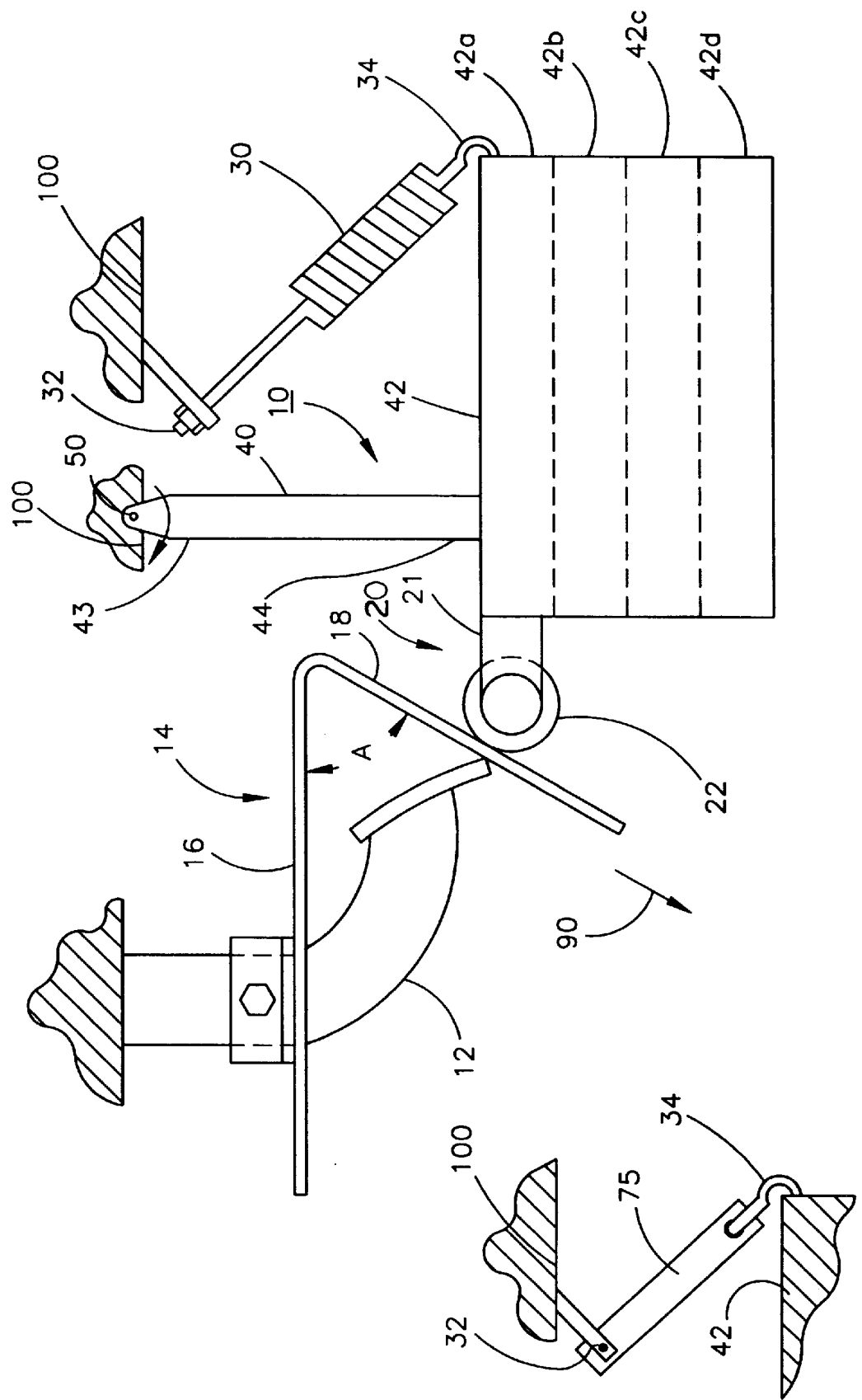
FIG. 1 is a schematic illustration of the braking system of the present invention.
Figure 2:
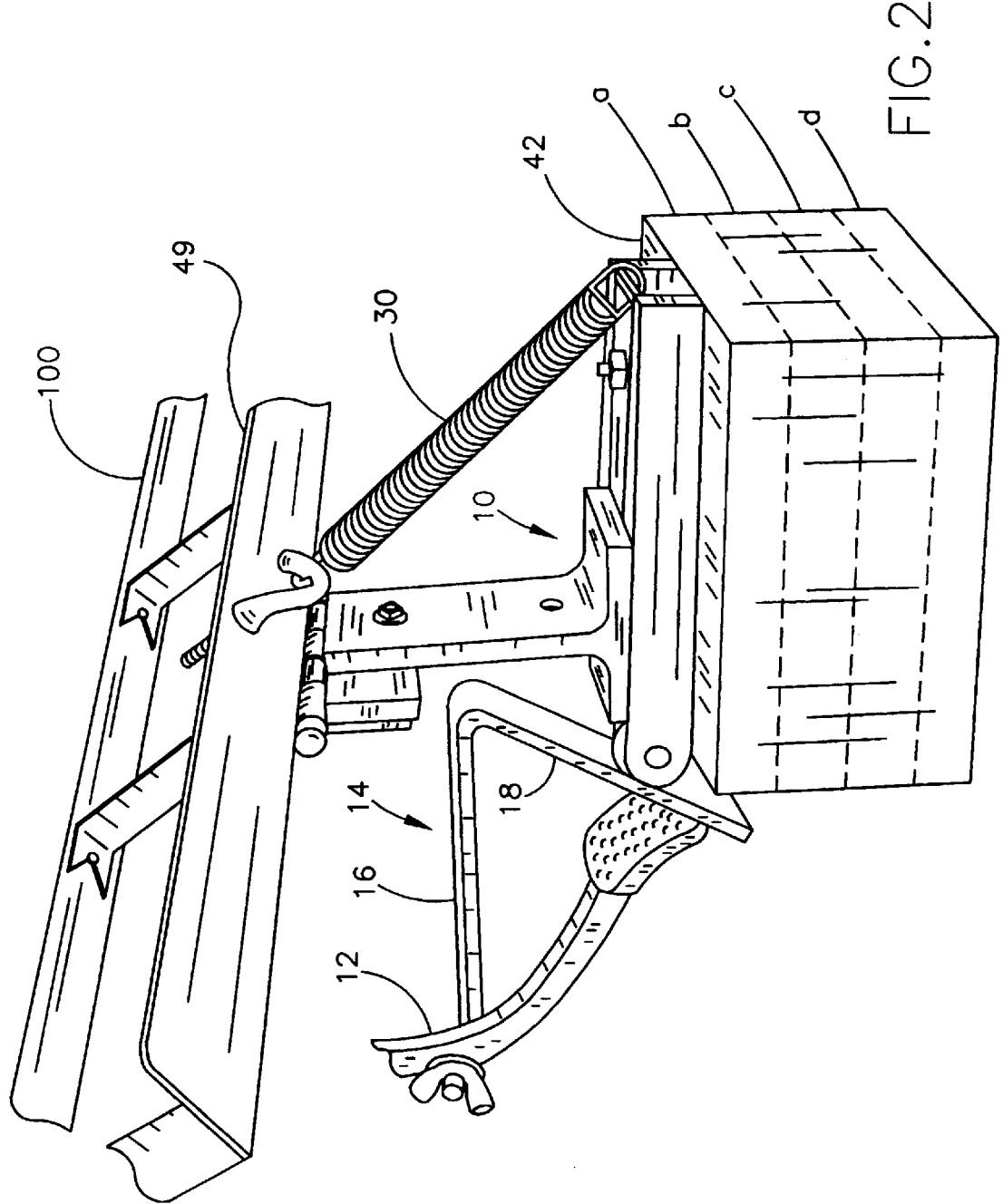
FIG. 2 is a perspective of the braking system of the present invention installed in a towed vehicle.

Turning now FIGS. 1 and 1A, there is shown a schematic illustration of a preferred embodiment of the present invention. The invention is comprised of weighted pendulum 10 which is pivotally attached at 50 to the towed vehicle 100. The pendulum includes pendulum arm 40 having a first end 43 and a second end 44 and weight 42 attached to the second end 44 of arm 40. Weighted pendulum 10 rotates about attachment point 50 in a swing path that is aligned with the direction of travel of the towed vehicle. The invention also includes a pedal engaging surface 20 attached to the front side of weighted pendulum 10 for contact and braking engagement with towed vehicle brake pedal 12. Pedal engaging surface 20 includes projecting engagement member 21 and roller 22 for making physical contact with brake pedal 12. It will be readily appreciated that roller 22 provides low-friction between the weighted pendulum 10 and brake pedal 12. Roller 22 may be fabricated from metal or a hard wearing plastic. This element may take the form of a cylinder or may have a spherical shape. In either case, roller 22 may have an outer coating of a rubber-like or elastomeric material for its wear and impact cushioning properties. The term "brake pedal" as used herein, refers not only to the foot pad for receiving the driver's foot but also to the lever arm and any linkage extending therefrom and connected thereto. Pivot point 50 should be located in close enough proximity to brake pedal 12 such that the swing path of weighted pendulum 10 intersects brake pedal 12. Weighted pendulum 10 may be physically attached directly to towed vehicle 100 or may be attached to a rigid support member 49 attached to towed vehicle 100 as shown in FIG. 2. Support member 49 would be required in situations where towed vehicle 100 does not have a structural member having the strength and physical location suitable for the practice of the present invention.

Although it is contemplated that the present invention will function adequately with the elements described thus far, certain other items may be added in a preferred embodiment. These items include brake pedal attachment 14 which is secured to the towed vehicle brake pedal 12 for braking engagement with the weighted pendulum 10 responsive to relative motion between the weighted pendulum 10 and the towed vehicle 100. Brake pedal attachment 14 in this embodiment is a v-shaped member having a first section 16 (in this embodiment horizontal) secured to brake pedal 12 and a second angled section 18 extending therefrom. The term "secured" as used herein, means a tight fastening of the two components such that they move as one unit. Suitable fasteners include bolts, clamps and the like. Pedal attachment 14 should have sufficient rigidity to bear the weight of weighted pendulum 10 and may be constructed of metal such as aluminum or steel or from a high-strength plastic. It will be apparent to one of ordinary skill in the art that brake pedal attachment 14 acts as a means for translating the pivoting travel of weighted pendulum 10 to the substantially straight line travel 90 of the brake pedal responsive to the relative motion between the weighted pendulum 10 and the towed vehicle 100 during deceleration of the towed vehicle. Other structures that could perform this means for translating function could incorporate curved sections instead of straight sections. Moreover, other structures could be mounted pivotally to the floor of towed vehicle.

The angle A between the two sections of brake pedal member 14 may vary as needed to create the type of fit on the brake pedal 12 shown in FIG. 1. It is believed that for passenger vehicles the angle may vary between about 50° and about 70°. Desirably, the angle between the two sections is about 60 degrees. The practice of the present invention includes using other angles as needed depending on the brake pedal orientation of the towed vehicle.

In a preferred embodiment the present invention may also include a swing controller 30 connected between weighted pendulum 10 and towed vehicle 100 for controlling the braking engagement of the weighted pendulum with the pedal attachment 14. In FIG. 1 swing controller comprises a spring 30 connected at one end 34 to weighted pendulum 10 and at an opposite end 32 to towed vehicle 100. The function of spring 30 is to prevent undesired operation of the apparatus as the towed vehicle goes down a steep hill. It will be readily understood that as the towed vehicle travels down such a hill, gravity will tend to make the weighted pendulum swing towards the brake pedal. This will happen even if the towed vehicle is not decelerating. Also it has been found that during level travel weighted pendulum 10 may engage brake pedal 12 unintentionally. Spring 30 has a spring constant sufficient to hold the weight of pendulum 10 in check during downhill travel but not so high as to impede desired operation during deceleration. For a weight of about 45 pounds it has been found that a coil spring having a length of about 6 inches and a diameter of about 1 inch with about 36 turns is suitable. Determining other spring constants for other weights is a matter of simple experimentation. In alternative embodiments swing controller 30 may take the form of strip of elastic material or any other device having physical properties such as elasticity similar to that of a spring. By way of non-limiting example, suitable elastic materials for use in the present invention include natural/synthetic rubber and elastomers.

Although the spring 30 is shown attached to towed vehicle 100 near the attachment point for weighted pendulum 10, the scope of the present invention includes attaching swing controller 30 to any other fixed point inside towed vehicle 100.

The operation of the brake system of the present invention is quite simple. As the brakes of a towing vehicle are applied both the towing and the towed vehicles will begin to decelerate. However, the inertia of weighted pendulum 10 will cause it to swing toward brake pedal 12 around pivot point 50 so as to apply the brakes of the towed vehicle. The amount of weight positioned at the end of weighted pendulum 10 may be varied depending on the amount of force required to apply the brakes of towed vehicle 100 effectively. Determining the correct amount of weight is a matter of simple experimentation well within the capability of one of ordinary skill in the art. For example, it has been found that for a small vehicle such as a Geo Tracker manufactured by the Chevrolet Company, a weight of about 45 pounds at the end of weighted pendulum 10 is sufficient to apply the brakes properly. It should be further noted that the amount of weight provided for weighted pendulum 10 is not necessarily a function of the size of the vehicle being towed but rather is a function of the amount of force necessary to apply the brakes of the towed vehicle. Therefore, a relatively large towed vehicle 100 requiring little brake pressure may require weighted pendulum 10 of less weight than that required for a smaller vehicle requiring more brake pedal pressure.

In a preferred embodiment, the weight 42 attached to weighted pendulum 10 may be comprised of or at least two or, alternatively, a plurality of separable sections or weight segments 42a,42b,42c,42d. In this embodiment the amount of force applied to brake pedal 12 may be varied as needed by adding or removing weight segments as desired. It should be noted that weight segments 42a,42b,42c,42d need not have identical size or weight.

Figure 3:
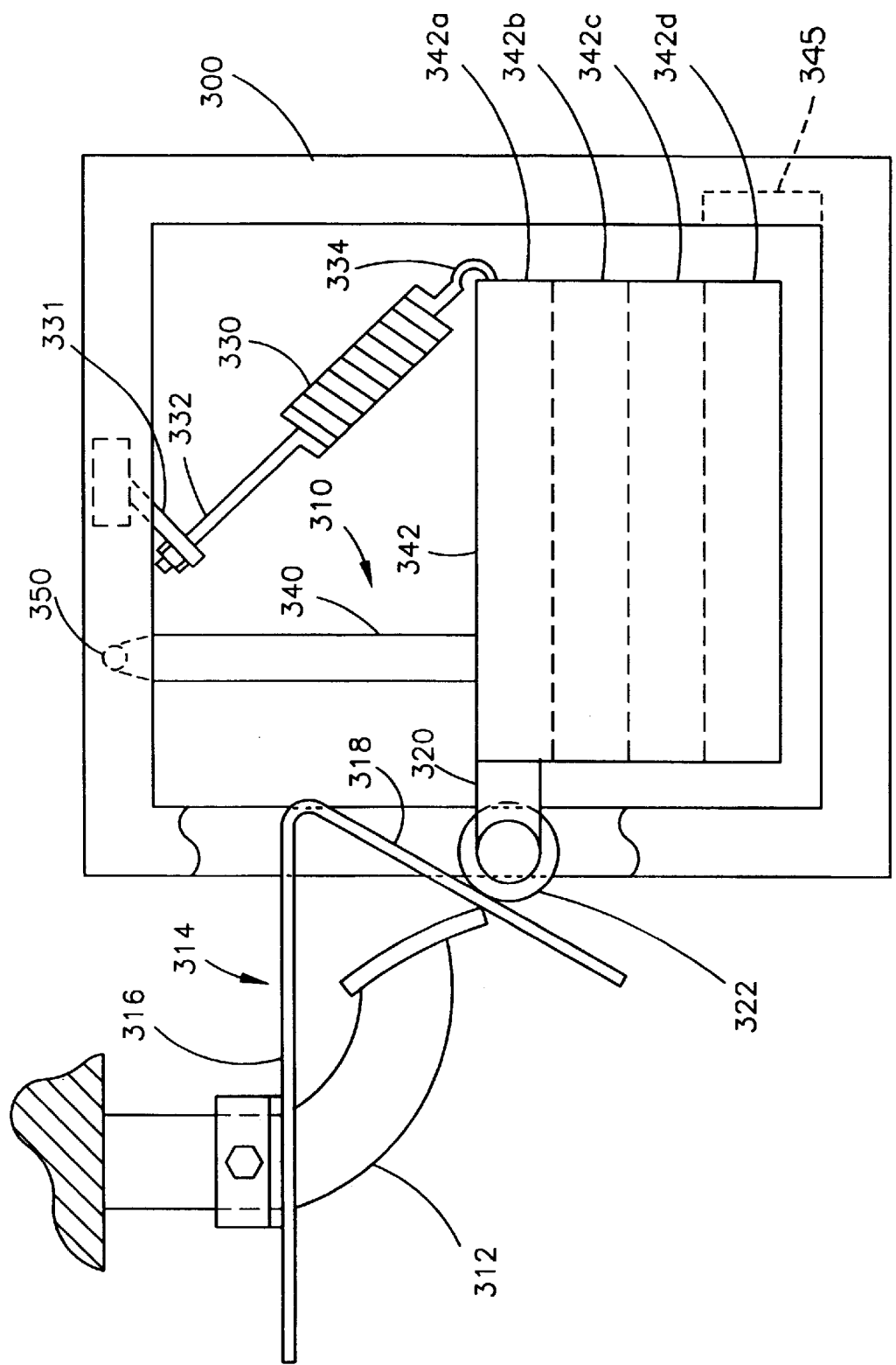
FIGS. 3 and 4 depict a partial cutaway side view and a rear view respectively of an alternative mounting arrangement for the present invention consisting of a frame for holding a weighted pendulum, the frame being bolted to the floor of the towed vehicle.
Figure 4:
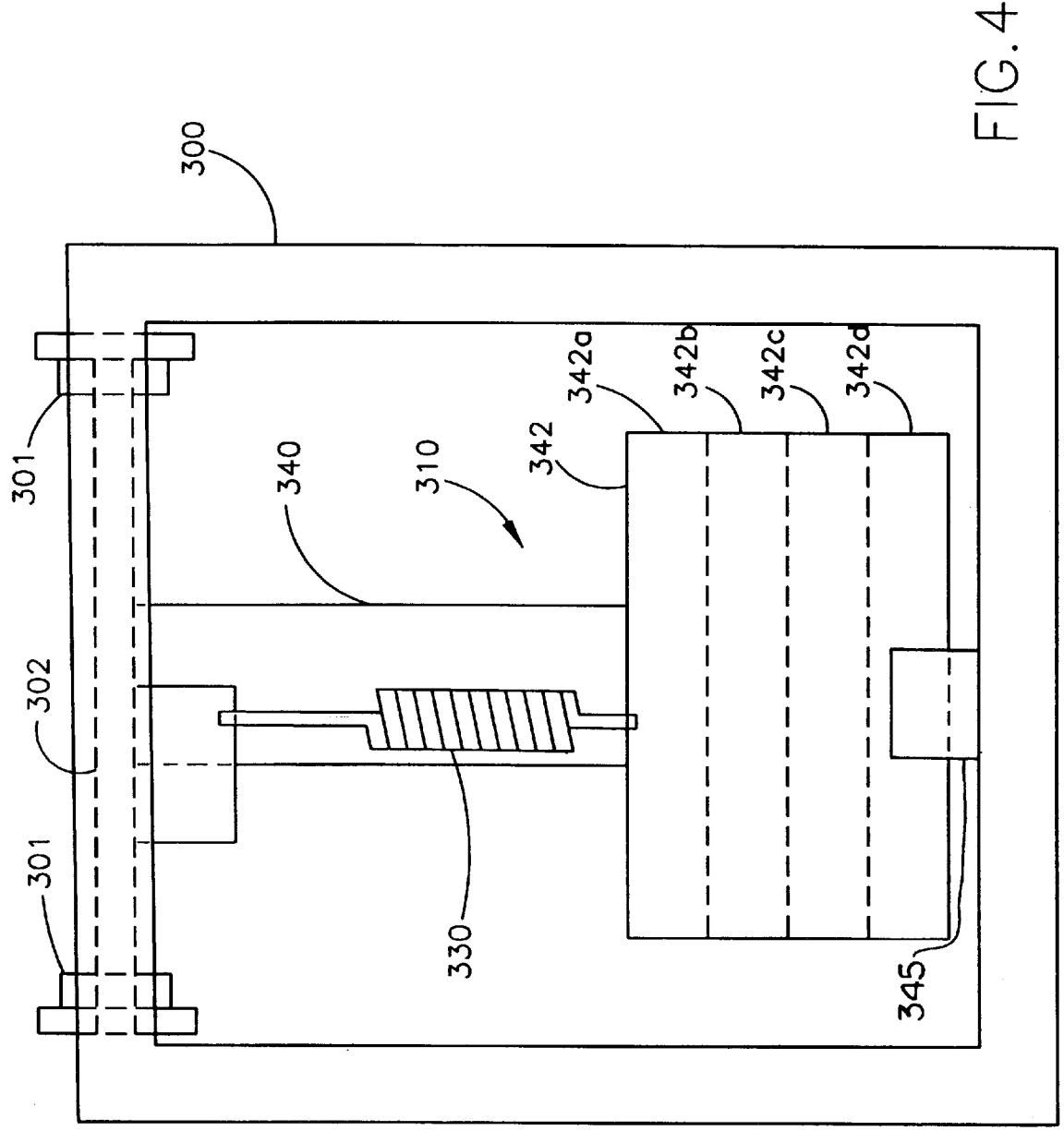
Figure 6:
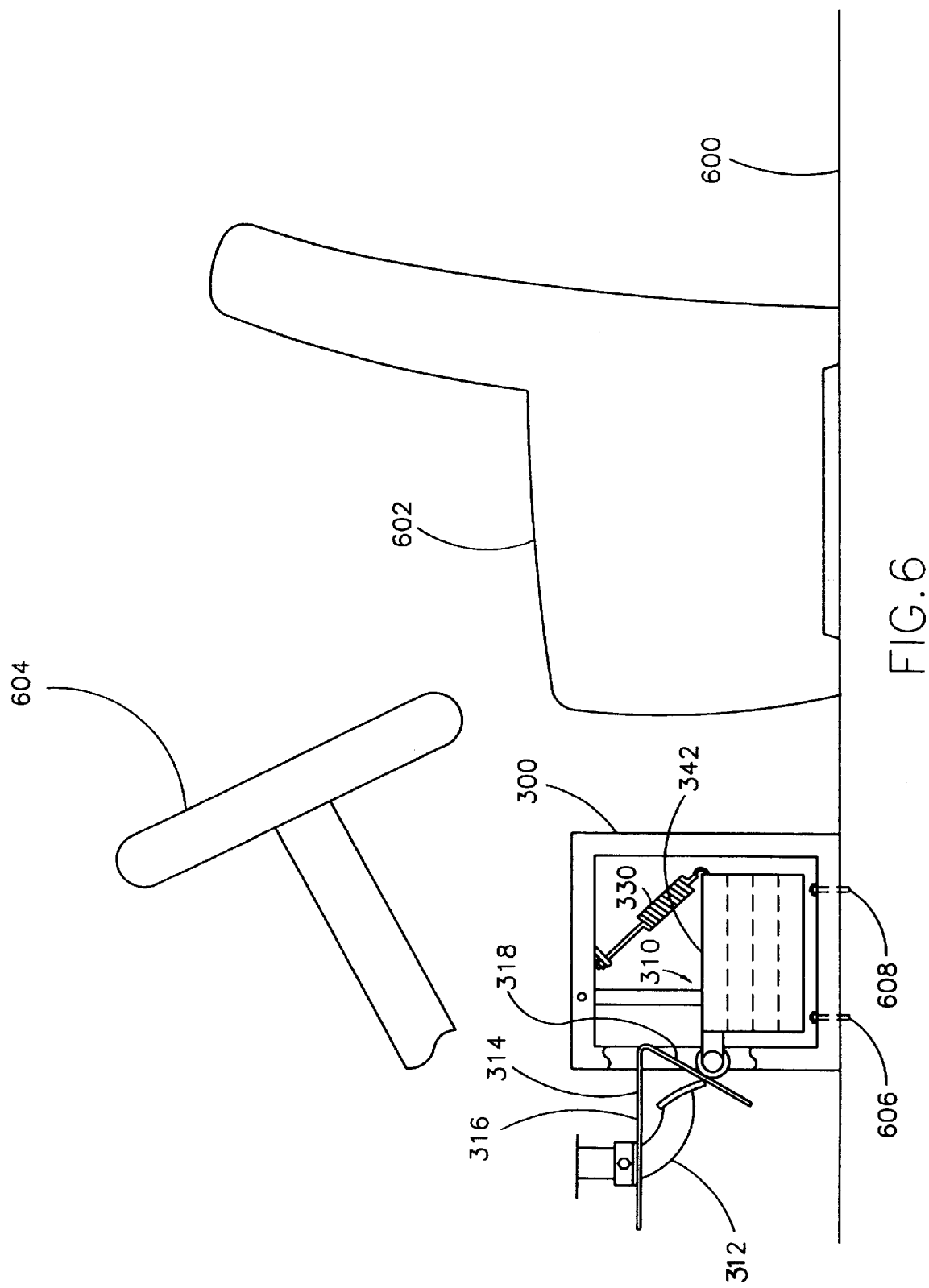
FIG. 6 illustrates the weighted pendulum of the present invention adapted for use as part of a breakaway braking system for a towed vehicle.

An alternative mounting arrangement is illustrated in FIGS. 3, 4 and 6. FIG. 3 is a partial cutaway, side elevation view in which a portion of the supporting structure described below is removed for clarity. In this embodiment weighted pendulum 310 is suspended from a box-shaped frame 300 at pivot point 350. Frame 300 is bolted to the floor 600 of towed vehicle 100 in front of seat 602 and beneath steering wheel 604. Weighted pendulum 310 is suspended from crossmember 302 which extends between the sides of frame 300. Crossmember 302 is pivotally mounted at each end by bearings 301. The frame is open at each end to permit weighted pendulum 310 to swing freely back and forth to engage brake pedal 312 and brake pedal attachment 314. Brake pedal attachment 314 is composed of a first section 316 secured to brake pedal 312 and a second angled section 318 extending therefrom. Weighted pendulum 310 is comprised of pendulum arm 340 which rotates about a pivot point 350 at the center of crossmember 302. (Note that in FIG. 3 bearings 301 have been deleted for clarity.) This embodiment may also include swing controller 330 attached at one end 332 to some point inside frame 300 and at the opposite end 334 to weight 342. Weight 342 may be comprised of at least two or, alternatively, a plurality of weight segments 342a,342b,342c,342d to vary the weight as needed for the proper operation of the apparatus. This embodiment may also include swing controller 330 attached at a first end 332 to downwardly extending member 331 and at a second end 334 to weight 342. Downwardly extending member 331 is connected to a second cross member extending between the sides of frame 300. Alternatively, swing controller 330 could be attached at its first end 332 to some fixed point inside towed vehicle 100.

Frame 300 may further include bumper 345 positioned behind weight 342 for limiting the travel of weight 342 away from brake pedal 312. Bumper 345 should be fabricated from a material having sufficient strength to stop the backward motion of weight 342 near the rear of frame 300. Suitable materials include metal and high-strength plastics. Bumper 345 may also include a protective pad constructed of rubber-like material to cushion any contact between bumper 345 and weight 342.

As best seen in FIG. 6, frame 300 is bolted securely to the floor 600 of towed vehicle 100 by bolts 606, 608. Frame 300 may be provided with a plurality of mounting holes or a slotted area so as to be positioned properly in a wide variety of towed vehicles. This embodiment has the advantage of being easily transportable between different towed vehicles. Frame 300 should be made of a material sturdy enough to hold the dead weight of weight 342 as well as withstand the forces generated as weighted pendulum 310 swings back and forth. Suitable materials for the frame 300 include steel and aluminum.

Figure 5:
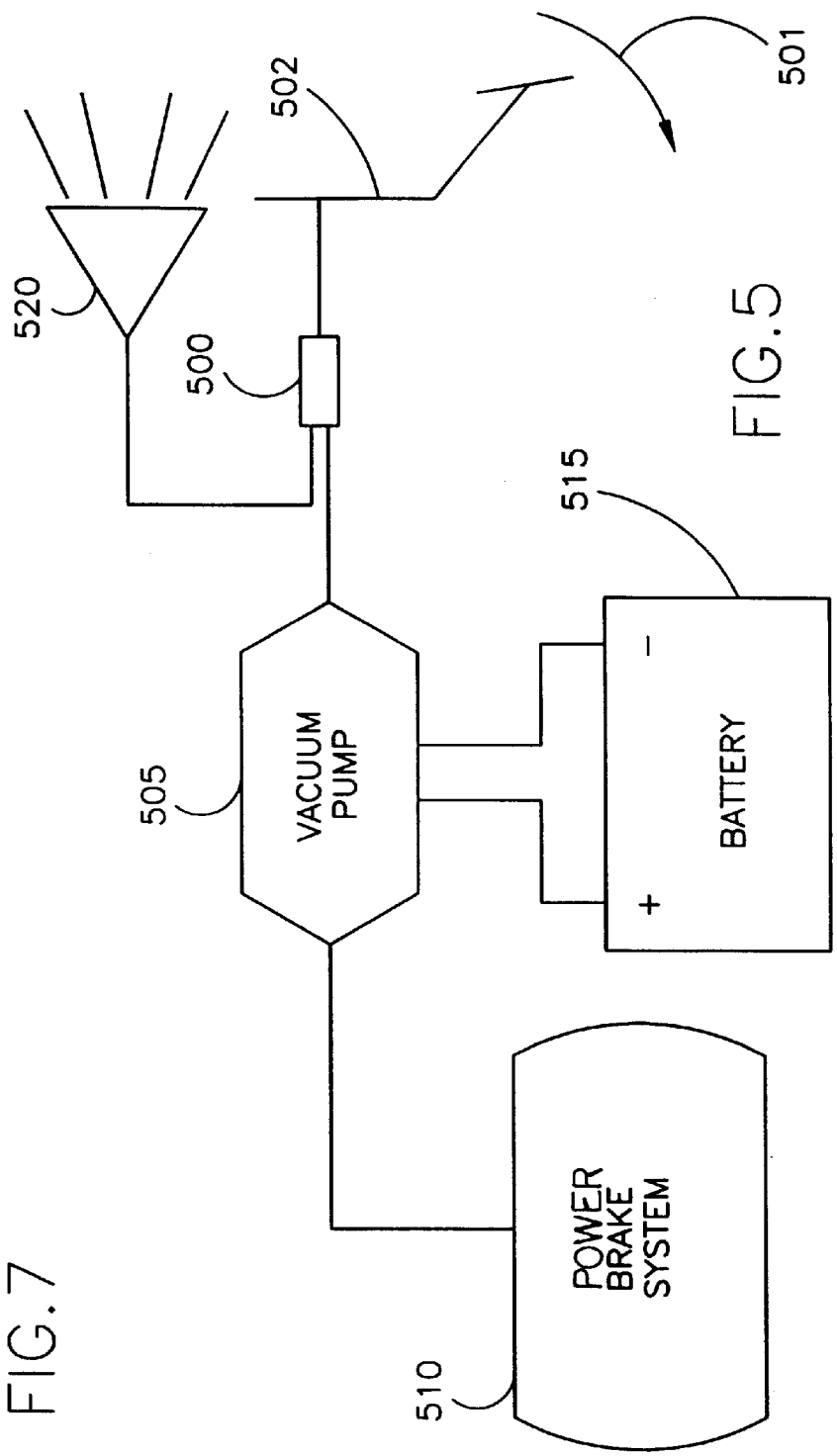
FIG. 5 illustrates an alternative embodiment of the present invention that includes a brake pedal activated vacuum pump for providing a vacuum assist to the power brake system of the towed vehicle.

In an alternative embodiment, the present invention may further include an interface with the vacuum-assisted power brake system of towed vehicle. It is well known that many brake systems require significantly more brake pedal pressure to stop a vehicle with the engine turned off because there is no source of vacuum available to the hydraulics of the towed vehicle braking system. Thus, it may be desirable to provide an auxiliary source of vacuum to facilitate operation of the towed vehicle brake system. One such embodiment is illustrated schematically in FIG. 5 and includes brake light switch 500, vacuum pump 505 which is connected to the towed vehicle's brake system 510. Vacuum pump 505 will be operated by the battery 515 of the towed vehicle 100 or by a separate battery to conserve the towed vehicle's battery energy. Operation of the vacuum pump may be initiated by a tie-in to the electric circuit that operates towed vehicle's brake lights. That is, as weighted pendulum 10 swings forward as indicated by arrow 501 and causes the initial movement of brake pedal 502, the brake pedal 502 will engage brake light switch 500 to operate the towed vehicle's brake lights 520 and also start the vacuum pump 505 tied into the power brake system 510. The vacuum thus supplied will increase the braking effect of the weighted pendulum. Switch 500 could be a modified brake light switch or could be a separate switch provided solely to initiate operation of vacuum pump. When weighted pendulum swings away from the brake pedal 502, brake light switch 500 ceases operation of the vacuum pump 505.

Figure 7:
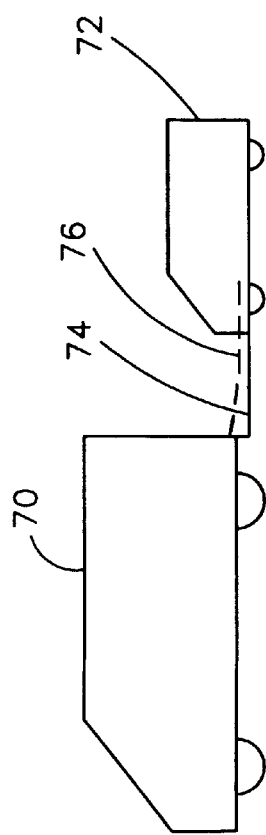
FIG. 7 is a schematic representation of a towing vehicle/ towed vehicle pair employing the emergency breakaway feature of the present invention.
Figure 8:
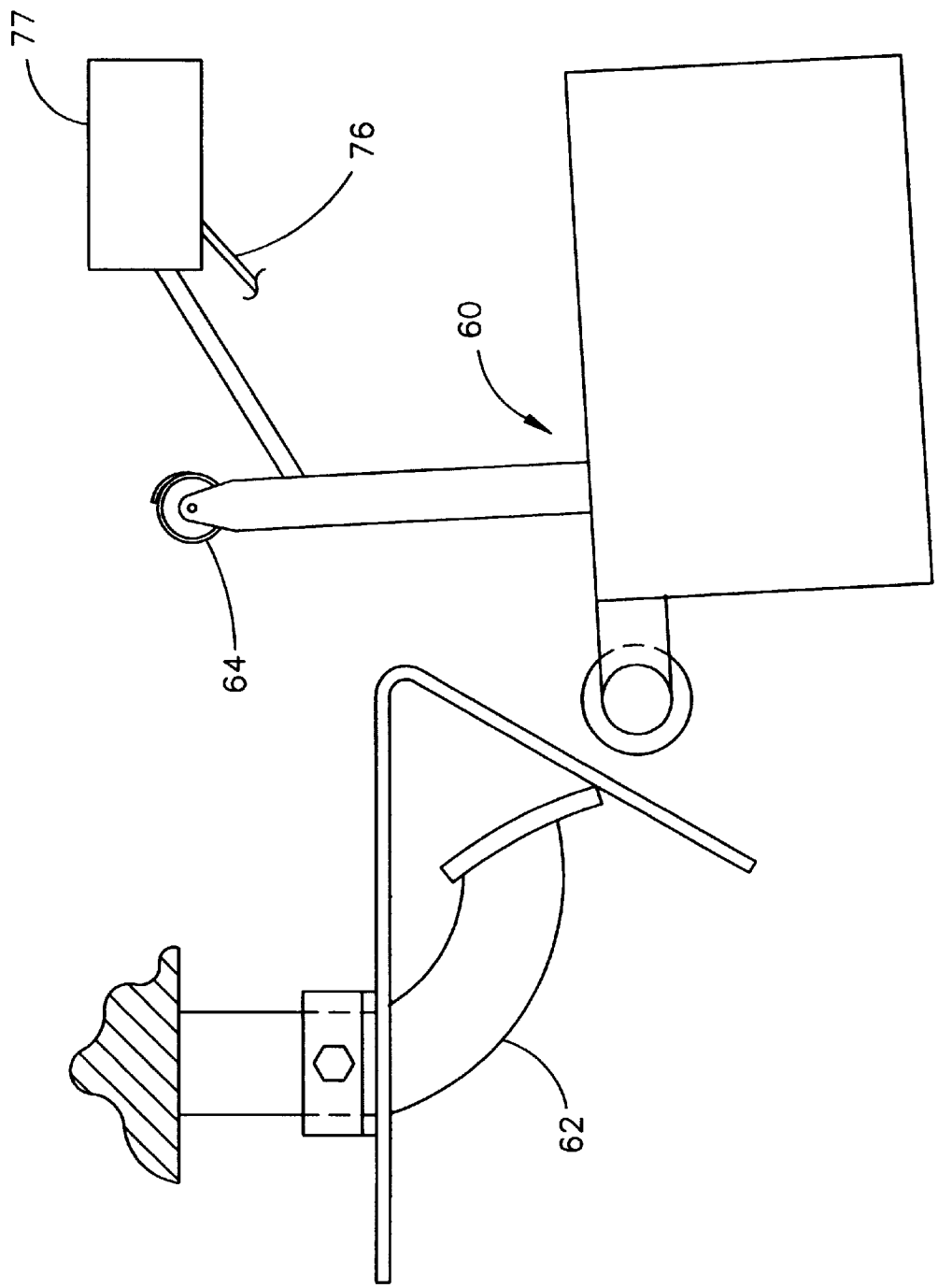
FIG. 8 is a schematic illustration of the emergency breakaway embodiment of the present invention.

In yet another embodiment, the present invention may function as a breakaway brake for the towed vehicle. As illustrated in FIGS. 7 and 8, towing vehicle 70 and towed vehicle 72 are connected by tow bar 74. Cable 76 extends from towing vehicle 70 into towed vehicle 72 where it attaches to release mechanism 77. In this embodiment, unlike those discussed above, weighted pendulum 60 is normally biased against brake pedal 62 with sufficient force to apply the brakes of towed vehicle 72. A coil spring 64 is a suitable device for generating this bias force. However, pendulum 60 is held away from brake pedal 62 against the biasing force by release mechanism 77. Should the towed vehicle 72 become separated from the towing vehicle 70, cable 76 will be pulled tight causing the activation of release mechanism 77 and in turn the braking engagement between weighted pendulum 60 and brake pedal 62. It will be readily understood that sufficient slack must be provided in breakaway cable (or chain) to allow the towing/towed vehicle pair to turn without unintentionally tripping release mechanism 77. Weighted pendulum may be suspended from a frame 300 bolted to vehicle floor 600 as shown in FIG. 6 or may be attached to towed vehicle as illustrated in FIGS. 1 and 2. Frame 300 may be secured to any other point inside towed vehicle 100 having sufficient strength to support the frame's weight. As an example, frame 300 may be secure to a seat frame or brace.

The simple design of the present invention provides several advantages over prior art systems for applying the brakes of a towed vehicle 100. First, the system does not require expensive and complicated pneumatic or hydraulic connections between the braking systems of the towing and towed vehicles. Further, the system does not require any modifications to conventional tow bars to include any type of auxiliary brake cylinder for applying the brakes of the towed vehicle. The braking system of the present invention is a simple mechanical device which is completely self-contained in the towed vehicle. The amount of force applied to brake pedal 12 in towed vehicle 100 may be varied quickly and easily by the addition or deletion of weight segments to weighted pendulum 10 as necessary for effective braking.

Yet another advantage of the present invention is its ability to apply the proper amount of braking force required under a wide variety of braking circumstances. For example, in the case of a panic stop during which the towed vehicle will decelerate very rapidly, weighted pendulum 10 will have a great deal of inertia and will thus engage brake pedal 12 with a relatively large amount of force. However, if towed vehicle 100 decelerates slowly there will still be relative motion between weighted pendulum 10 and towed vehicle 100, but the amount of force applied to brake pedal 12 will be less than that in the panic stop situation described above.

An additional advantage of the present invention is the fact that it does not require a physical invasion of the piping or pressurized hoses of the towed vehicle brake system. Any time that brake system components are cut for the installation of additional components there is an opportunity for the creation of a joint or a connection that can leak. As will be readily apparent to one of ordinary skill in the art, the more connections and fittings that are included in any hydraulic system, the more opportunities there are for potentially dangerous leaks.

Yet another advantage of the present invention stems from the use of weight segments 42a, 42b, 42c, 42d as shown in FIG. 1. Typically a total weight of about 45 pounds is used in the present invention. This weight could be awkward to handle and may be difficult to pick up for older consumers. This potential problem may be addressed readily by disassembling the multi-segmented weight to reduce the amount of weight to be handled to a more manageable quantity. After this smaller weight has been installed in the towed vehicle, additional weight segments may be added until the desired total weight is achieved.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What I claim is:

1. A device for applying the brakes of a towed vehicle having a brake pedal and a floor comprising:
    a) an arm having a first end and a second end, the first end pivotally attached to the towed vehicle;
    b) a weight located at the arm second end; and
    c) a brake pedal engaging surface also located at the arm second end and configured to actuate the towed vehicle brake pedal responsive to the deceleration of the towed vehicle.

2. The device of claim 1 further comprising a brake pedal attachment secured to the brake pedal for engagement with the pedal engaging surface whereby the brake pedal is depressed responsive to the relative movement between the weight and the towed vehicle.

3. The device of claim 1 wherein the weight is comprised of at least two separable weight segments.

4. The device of claim 1 further comprising a swing controller connected between the weight and the towed vehicle for controlling the braking contact of the weight with the towed vehicle brake pedal.

5. The device of claim 4 wherein the swing controller is a spring.

6. The device of claim 4 wherein the brake pedal engaging surface further comprises a roller.

7. The device of claim 1 wherein the arm is suspended from a frame detachably mounted on the floor of the towed vehicle.

8. The device of claim 1 wherein the towed vehicle includes a vacuum-based braking system and the device further comprises a source of vacuum connectable to the towed vehicle brake system to augment the actuation of the towed vehicle braking system.

9. The device of claim 8 wherein the source of vacuum is an auxiliary vacuum pump.

10. A towed vehicle braking system for use with a towed vehicle having a brake pedal, the system comprising:
    a) a weighted pendulum secured to the towed vehicle and having a swing path aligned with the direction of travel of the towed vehicle; and
    b) a brake pedal attachment secured to the towed vehicle brake pedal for contacting the weighted pendulum responsive to relative motion between the weighted pendulum and the towed vehicle.

11. A towed vehicle braking system according to claim 10 further comprising a swing controller connected between the weighted pendulum and the towed vehicle for controlling the braking engagement of the weighted pendulum with the brake pedal.

12. A towed vehicle braking system according to claim 11 wherein the swing controller is a spring.

13. A towed vehicle braking system according to claim 10 wherein the pedal attachment is a v-shaped member having a first section attached to the brake pedal and an angled second section extending therefrom to create an angle between the sections wherein the angled section makes braking engagement with the weighted pendulum.

14. A towed vehicle braking system according to claim 10 wherein the weighted pendulum further comprises a pedal engaging surface for contact with the pedal attachment during braking.

15. A towed vehicle braking system according to claim 14 wherein the weighted pendulum further comprises at least two separable weight segments.

16. A towed vehicle braking system according to claim 10 wherein the towed vehicle includes a vacuum-based braking system and the system further comprises a source of vacuum connectable to the towed vehicle brake system to augment the actuation of the towed vehicle braking system.

17. A towed vehicle braking system according to claim 16 wherein the source of vacuum is an auxiliary vacuum pump.

18. A towed vehicle braking system for a towed vehicle including a brake pedal, the system comprising:
    a) a weighted pendulum secured to the towed vehicle and having a swing path in the direction of travel of the towed vehicle; and
    b) a means for translating the pivoting travel of the weighted pendulum to substantially straight line travel of the brake pedal responsive to relative motion between the weighted pendulum and the towed vehicle.

19. The towed vehicle braking system of claim 18 wherein the means for translating is a pedal attachment secured to the towed vehicle brake pedal.

20. The towed vehicle braking system of claim 19 wherein the pedal attachment comprises a first section attached to the brake pedal and an angled second section extending therefrom.

21. The towed vehicle braking system of claim 18 wherein the weighted pendulum further comprises a pedal engaging surface for contact with the pedal attachment during braking.

22. The towed vehicle braking system of claim 18 wherein the towed vehicle includes a vacuum-based braking system and the system further comprises a source of vacuum connectable to the towed vehicle brake system to augment the actuation of the towed vehicle braking system.

23. The towed vehicle braking system of claim 22 wherein the source of vacuum is an auxiliary vacuum pump.

24. A method for applying the brakes of a towed vehicle having a brake pedal comprising:
   a) providing a weighted pendulum pivotally attached to the towed vehicle and having a swing path aligned with the direction of travel of the towed vehicle;
   b) providing a brake pedal attachment secured to the towed vehicle brake pedal for braking engagement with the weighted pendulum; and
   c) applying the brakes of the towed vehicle responsive to relative motion between the weighted pendulum and the towed vehicle.

25. The method of claim 24 wherein the brake pedal attachment is a pedal operating member including a first section secured to the brake pedal and an angled second section extending therefrom to form an angle between the two sections.

26. The method of claim 24 wherein the towed vehicle brake system is vacuum-based and further comprising applying a source of vacuum to the towed vehicle brake system substantially simultaneously with the step of applying the brakes of the towed vehicle whereby the source of vacuum increases the braking force generated by the towed vehicle brake system.

27. A towed vehicle braking system for use with a towed vehicle having a brake pedal, the system comprising:
   a) a weighted pendulum attached to the towed vehicle and having a swing path aligned with the direction of travel of the towed vehicle the weighted pendulum including
      i) a pendulum arm;
      ii) a weight attached to the pendulum arm, the weight including a brake pedal engaging surface and comprised of a plurality of separable weight segments;
   b) a brake pedal attachment secured to the towed vehicle brake pedal wherein the brake pedal attachment is a v-shaped member having a substantially horizontal section attached to the brake pedal and an angled section extending therefrom to create an angle of about 60 degrees between the sections wherein the angled section presents the pedal engaging surface for braking engagement with the weighted pendulum; and
   c) a swing controller connected between the weighted pendulum and the towed vehicle for controlling the braking engagement of the weighted pendulum with the brake pedal member.

28. A braking system according to claim 27 wherein the swing controller is a spring.

29. A breakaway brake apparatus for a towed vehicle having a brake pedal, the apparatus comprising:
   a) a cable attached at a first end to a towing vehicle and at a second end to a release mechanism,
   b) a weighted pendulum attached to the towed vehicle and having a swing path aligned with the direction of travel of the towed vehicle the weighted pendulum including
      i) a pendulum arm;
      ii) a weight attached to the pendulum arm, the weight including a brake pedal engaging surface; wherein the weighted pendulum is normally biased into braking engagement with the towed vehicle brake pedal, whereby the weighted pendulum is held against a biasing force by the release mechanism.

30. A breakaway brake apparatus according to claim 29 further comprising a brake pedal attachment secured to the towed vehicle brake pedal for translating the pivotal motion of the weighted pendulum into substantially straight line motion of the towed vehicle brake pedal.

* * * * *

UNITED STATES PATENT AND TRADEMARK OFFICE
CERTIFICATE OF CORRECTION

PATENT NO : 5,954,164
DATED : September 21, 1999
INVENTOR(S): Buddy L. Latham

It is certified that error appears in the above-identified patent and that said Letters Patent are hereby corrected as shown below:

In Claim 27, column 10, line 12, the last word "member" should be deleted.

Signed and Sealed this

Fourth Day of April, 2000

*Attest:*

Q. TODD DICKINSON

*Attesting Officer*      *Director of Patents and Trademarks*